Figure 14:
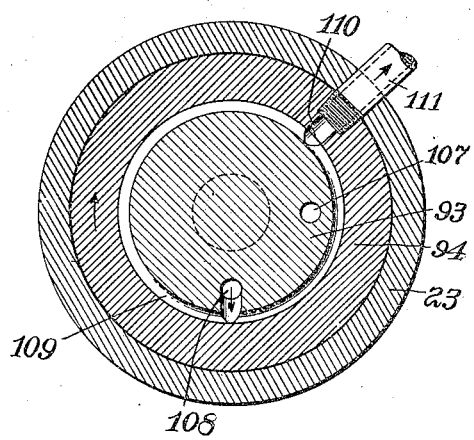
Figure 15:
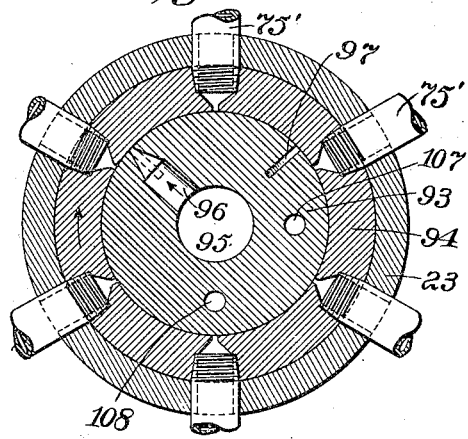

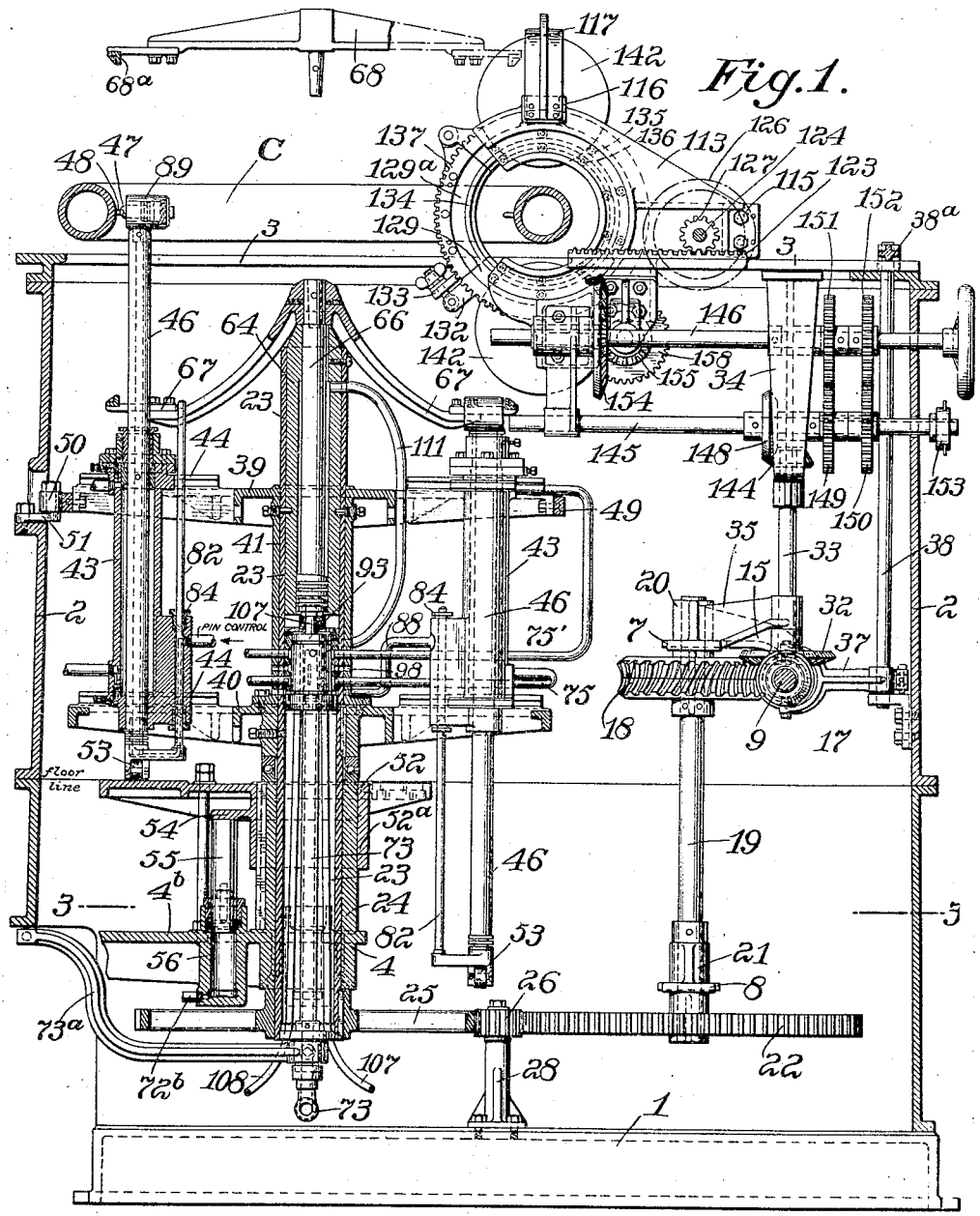

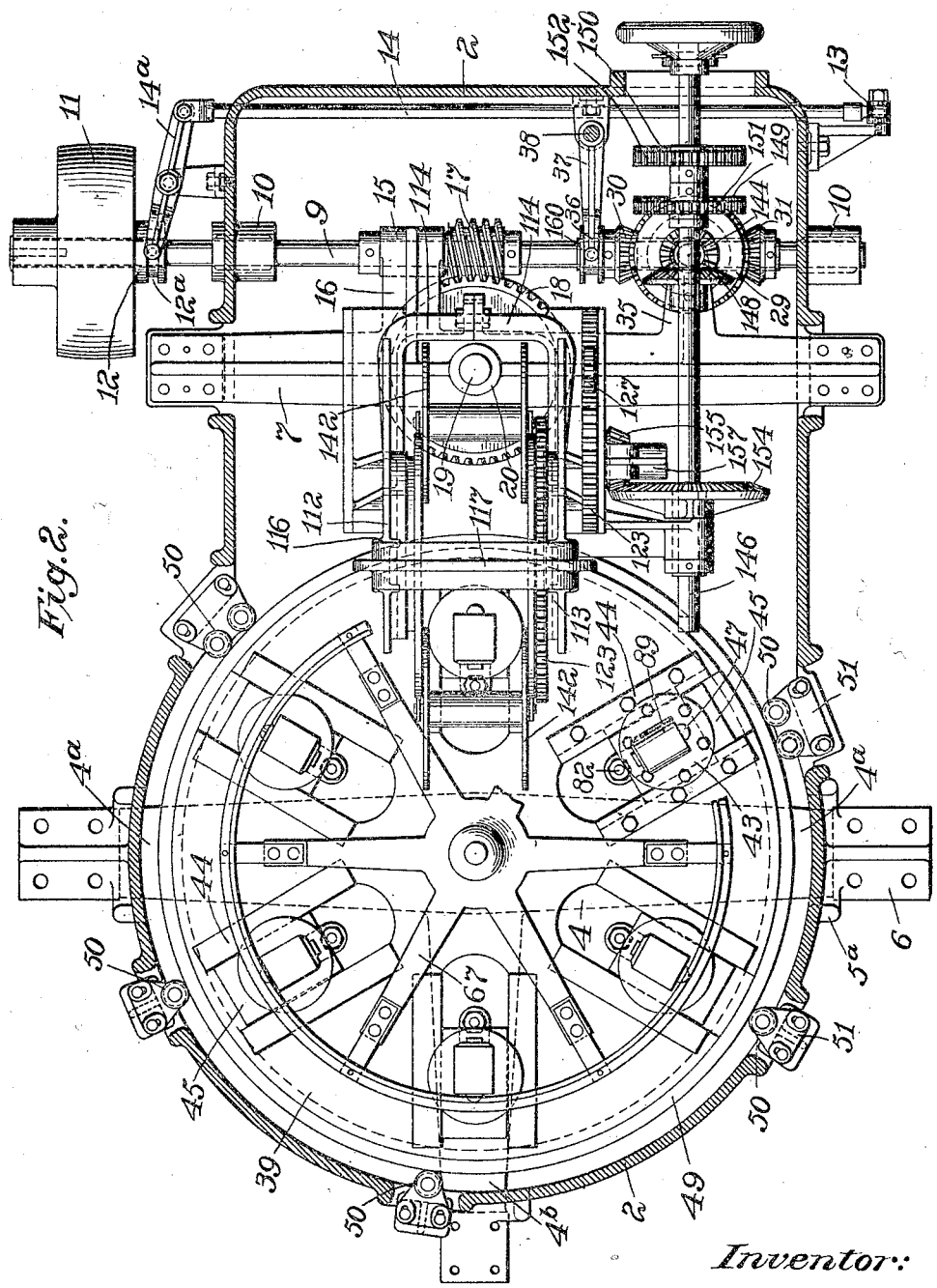

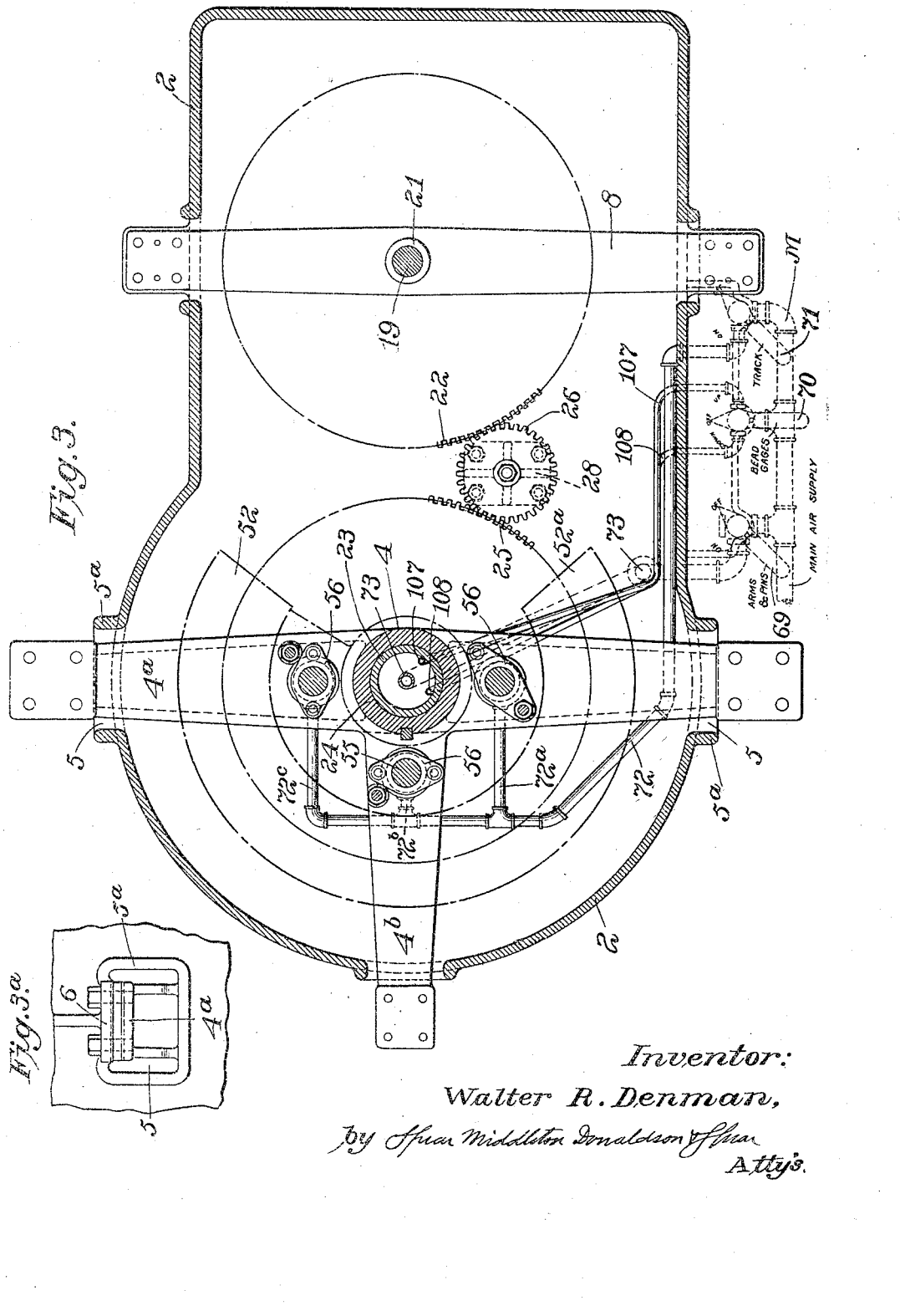

W. R. DENMAN.
TIRE WINDING MACHINE (PNEUMATIC CONTROL).
APPLICATION FILED MAY 1, 1916.
1,211,827.
Patented Jan. 9, 1917.
10 SHEETS—SHEET 4.
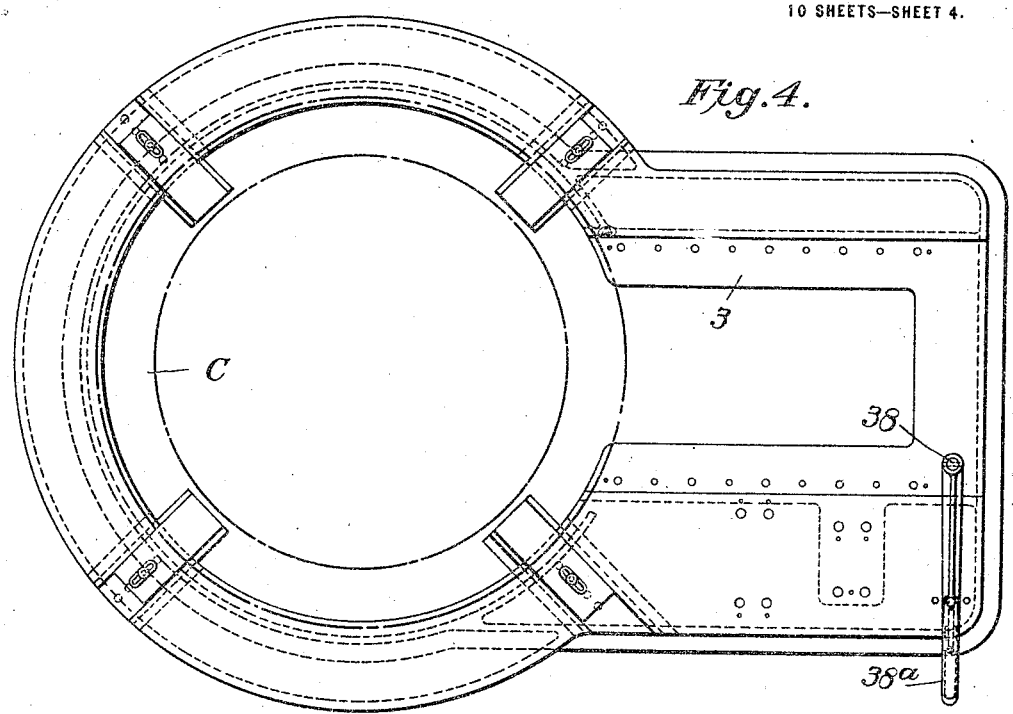
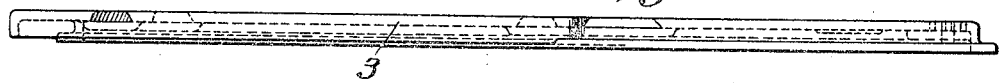
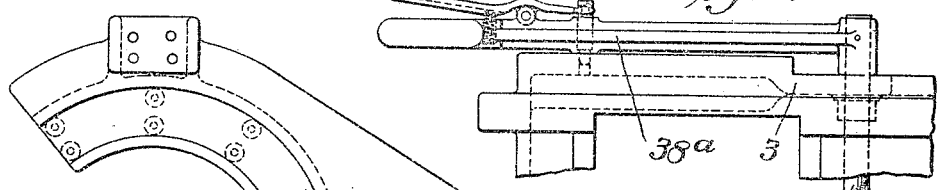
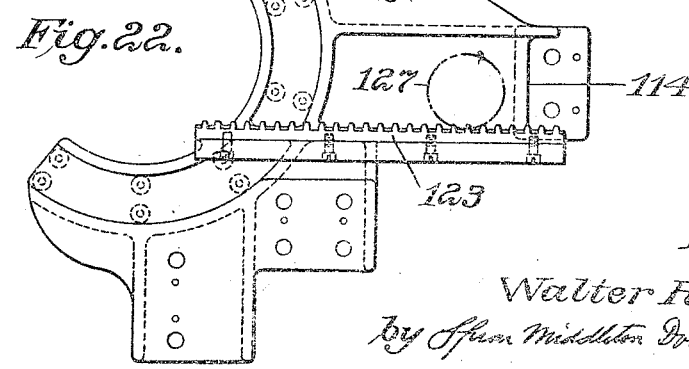
Inventor:
Walter R. Denman,
by Sham Middleton Donaldson Sham
Atty's.

W. R. DENMAN.
TIRE WINDING MACHINE (PNEUMATIC CONTROL).
APPLICATION FILED MAY 1, 1916.
1,211,827.
Patented Jan. 9, 1917.
10 SHEETS—SHEET 5.
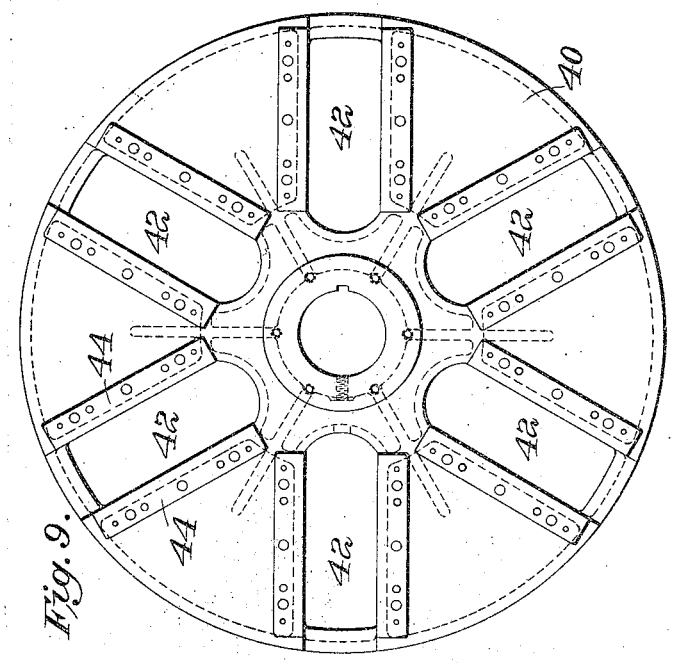
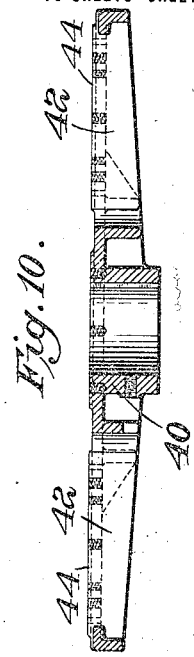
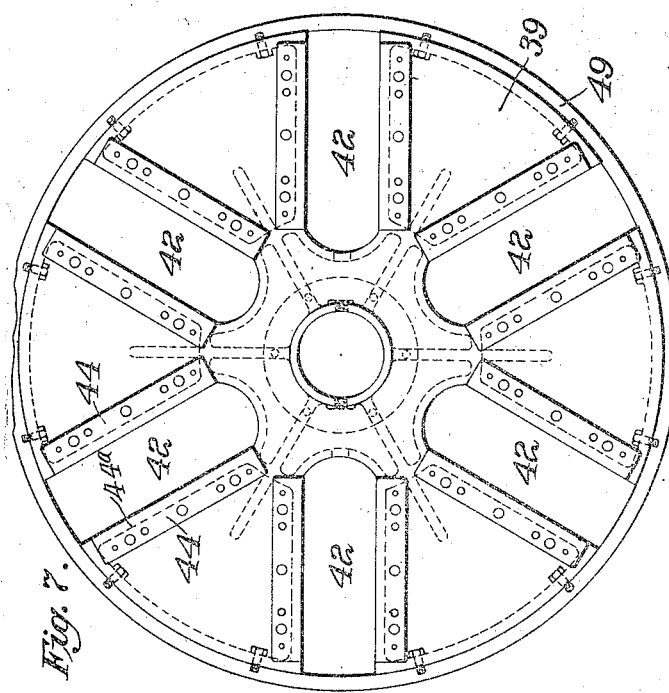
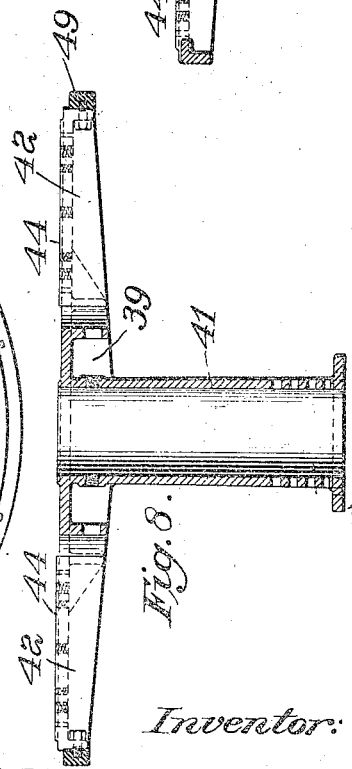
Inventor:
Walter R. Denman, W. R. DENMAN.
TIRE WINDING MACHINE (PNEUMATIC CONTROL).
APPLICATION FILED MAY 1, 1916.
1,211,827.
Patented Jan. 9, 1917.
10 SHEETS—SHEET 6.
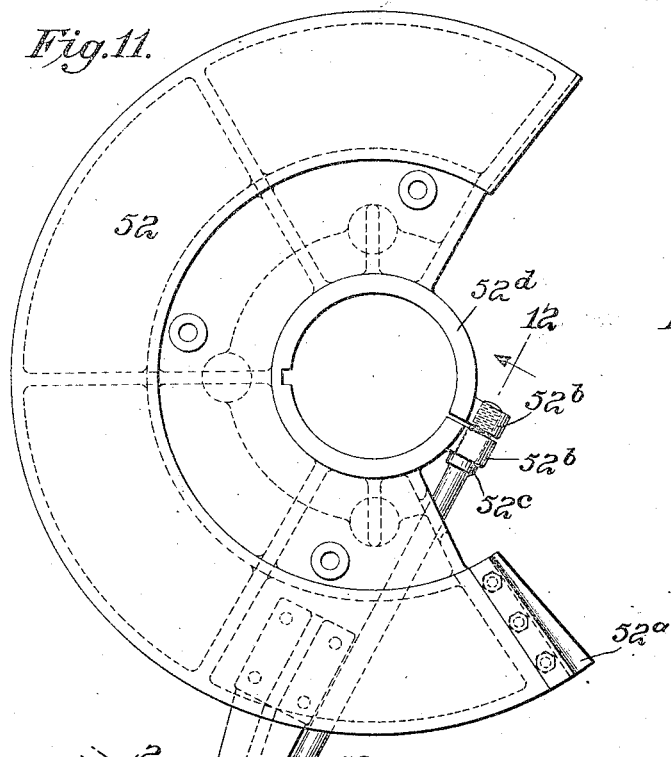
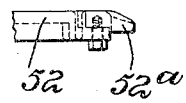
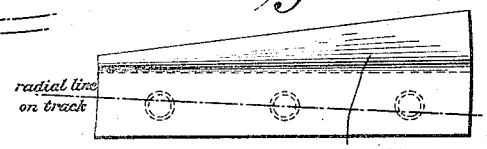
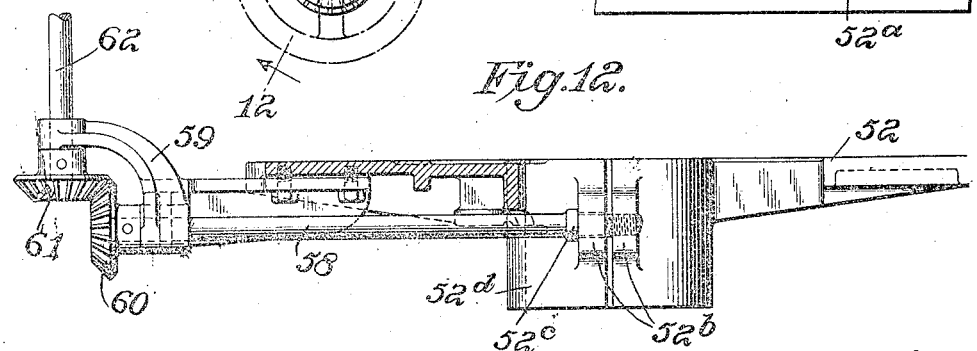
Inventor:
Walter R. Denman,
by Offner Middleton Donaldson & Offner
Attys.

W. R. DENMAN.
TIRE WINDING MACHINE (PNEUMATIC CONTROL).
APPLICATION FILED MAY 1, 1916.

1,211,827.

Patented Jan. 9, 1917.
10 SHEETS—SHEET 7.

Inventor:
Walter R. Denman,
by Spear Middleton Donaldson & Spear
Attys.

W. R. DENMAN.
TIRE WINDING MACHINE (PNEUMATIC CONTROL).
APPLICATION FILED MAY 1, 1916.
1,211,827.
Patented Jan. 9, 1917.
10 SHEETS—SHEET 8.
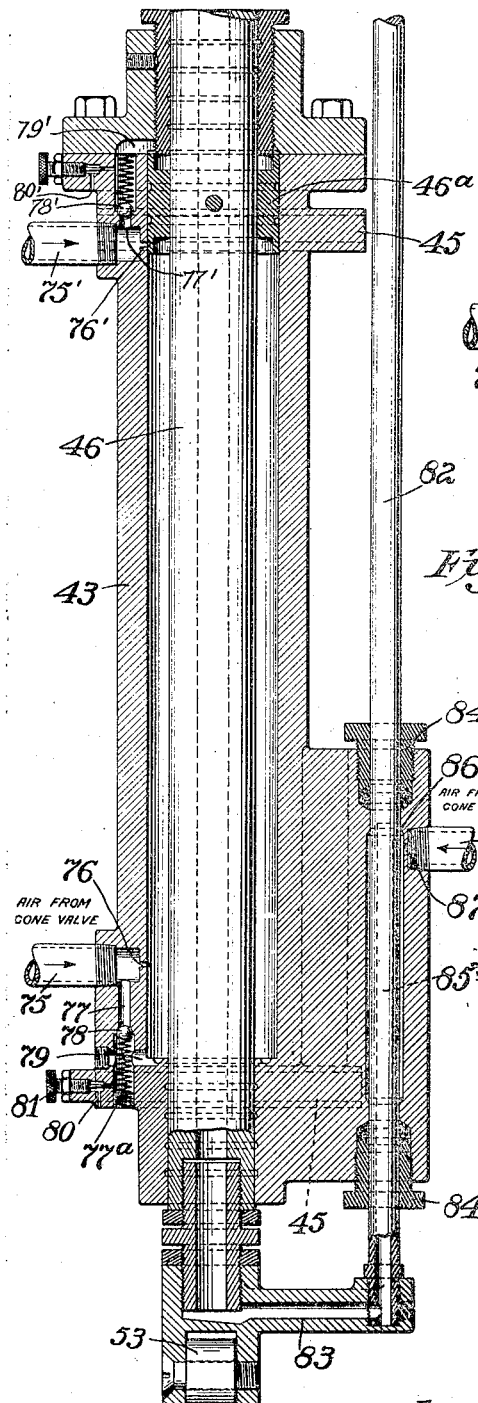
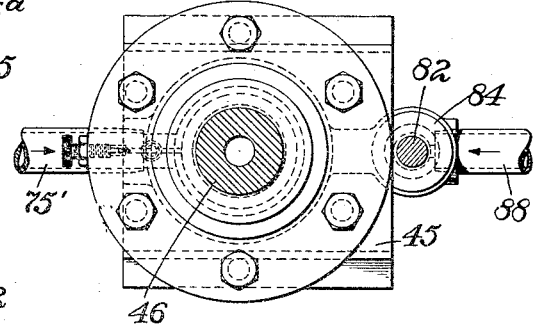
Fig. 19
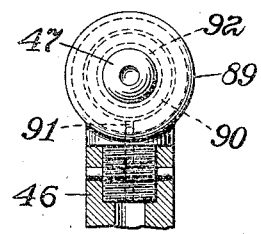
Fig. 18.
Fig. 20.
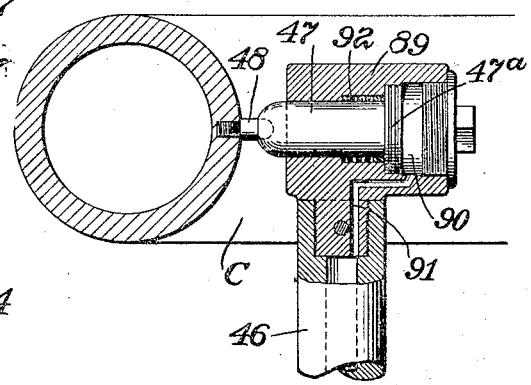
Fig. 18.ª
Inventor:
Walter R. Denman,
by Thos. Middleton Donaldson & Shea
Atty's

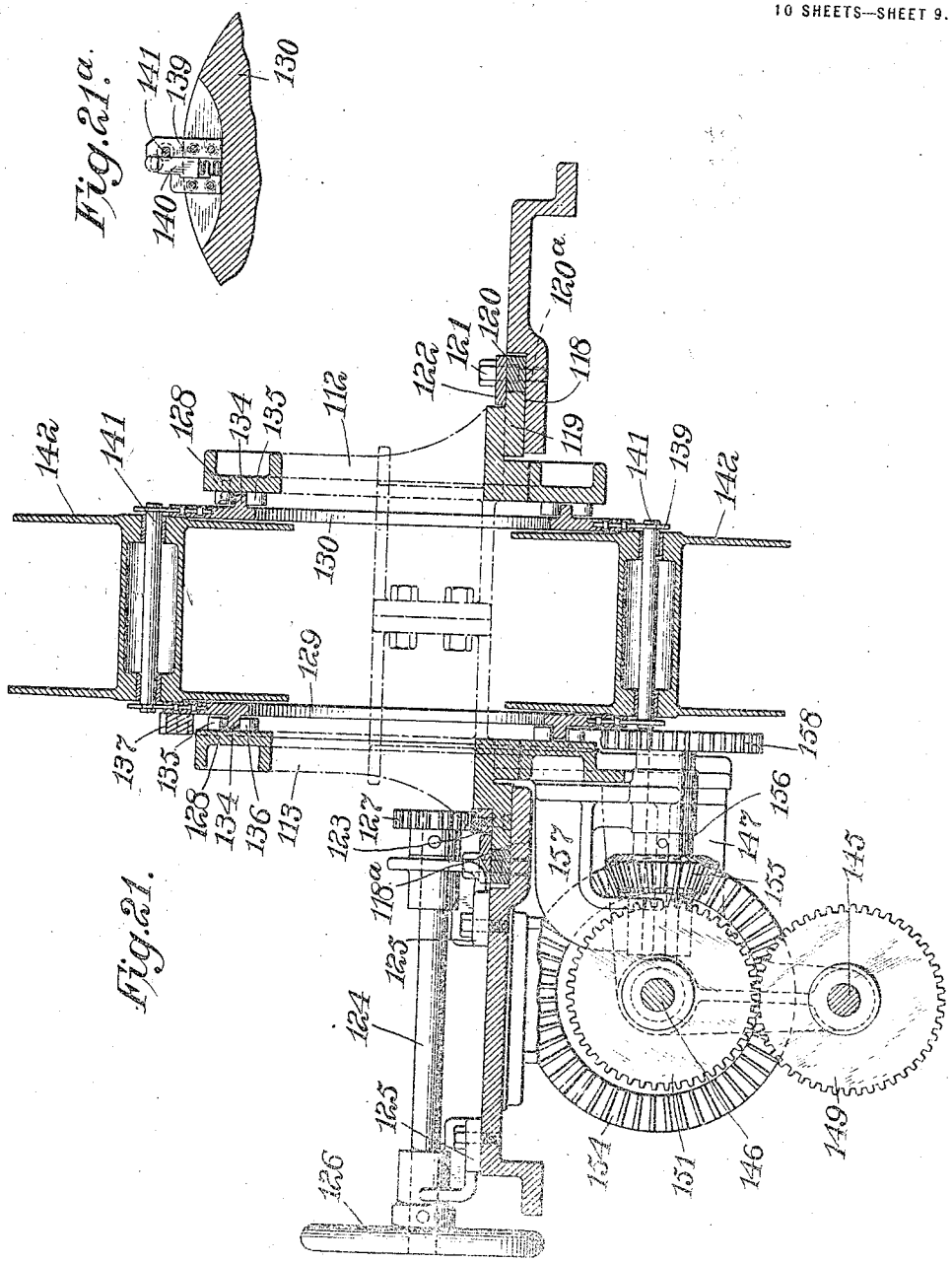

W. R. DENMAN.
TIRE WINDING MACHINE (PNEUMATIC CONTROL).
APPLICATION FILED MAY 1, 1916.
1,211,827.
Patented Jan. 9, 1917.
10 SHEETS—SHEET 10.
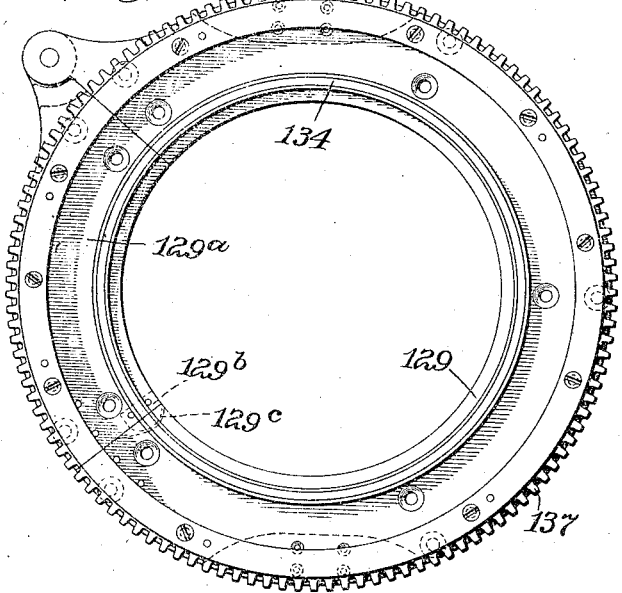
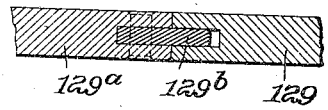
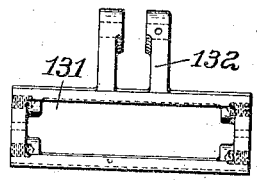
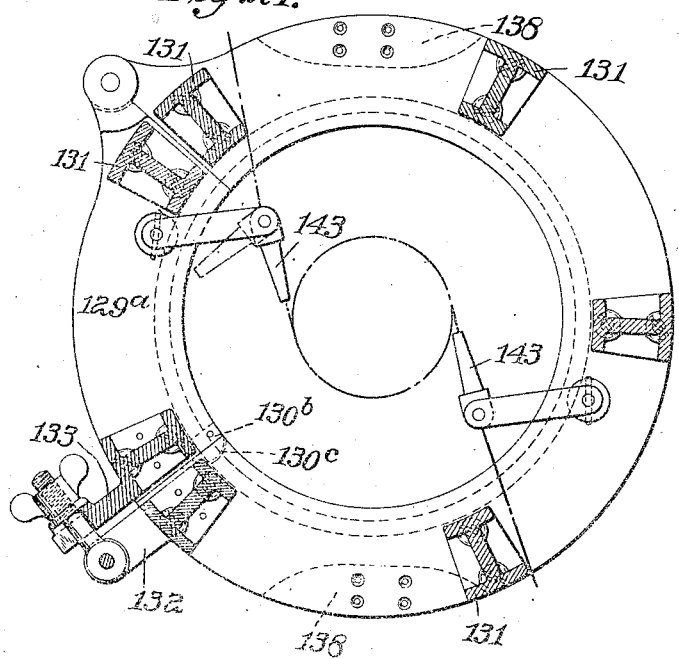
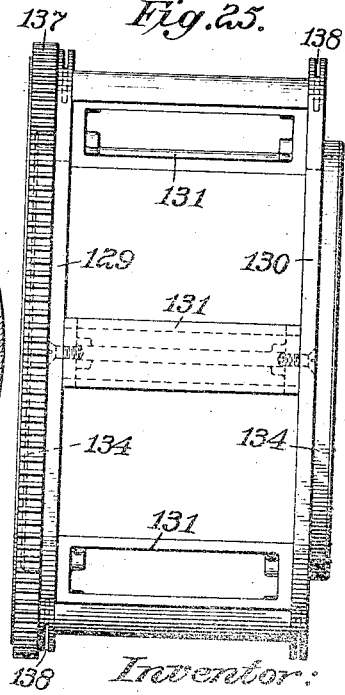
Inventor:
Walter R. Denman,
by his Attorneys

UNITED STATES PATENT OFFICE.

WALTER R. DENMAN, OF AKRON, OHIO, ASSIGNOR TO THE MILLER RUBBER COMPANY OF AKRON, OHIO, A CORPORATION OF OHIO.

TIRE-WINDING MACHINE, (PNEUMATIC CONTROL.)

1,211,827.   Specification of Letters Patent.   Patented Jan. 9, 1917.

Application filed May 1, 1916. Serial No. 94,747.

*To all whom it may concern:*

Be it known that I, WALTER R. DENMAN, a citizen of the United States, residing at Akron, Ohio, have invented certain new and useful Improvements in Tire-Winding Machines, (Pneumatic Control,) of which the following is a specification.

The present invention relates to winding machines and pertains more particularly to that class of machines which are adapted to wind cord or tape spirally around a closed ring core.

The present invention contemplates the provision of a machine of the general type above referred to, which will be primarily designed and intended for use in the construction of cord tire carcasses for pneumatic tires. A machine of this general character is shown and described in my co-pending application, Serial No. 76,041 filed February 3rd, 1916.

The principal object of the present invention is to provide a machine for winding upon a ring core spiral convolutions of cord to form one or more cord plies completely covering the surface of the ring core.

The invention also comprises certain improved supporting and driving means by which a constant rotation of the ring core member is effected during the winding operation.

A further object of the invention consists in providing improved winding or laying mechanism by means of which the angle at which the cord is wound upon the surface of the ring core may be varied and regulated to meet the various requirements of the article to be produced.

A still further object of the invention is the provision of a system of pneumatic or fluid pressure control by which the operations of the several mechanisms and instrumentalities may be quickly and readily governed.

A further object of the invention consists in providing a ring core supporting mechanism comprising a plurality of supporting arms adapted to engage with the inner circumference of the ring core and adapted to be successively withdrawn from engagement with the core at the time that portion of the core is being wound with cord. According to the present invention, pneumatic means are provided for automatically effecting the successive withdrawal and return of these supporting arms from and to the ring core.

The invention also contemplates certain variations and adjustments of the several parts which enable the machine to be used in the construction of cord tire carcasses of different dimensions.

With these and other objects, which include various modifications and refinements of the earlier machine disclosed in my co-pending application, the invention comprises the novel features of construction and combination and arrangement of parts more fully described in the following specification, illustrated in the accompanying drawings and more particularly pointed out in the appended claims:—

Figure 13:
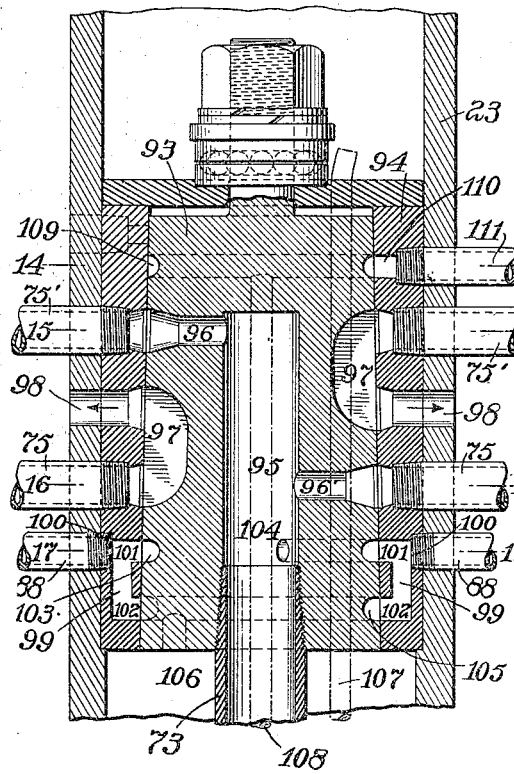
Figure 16:
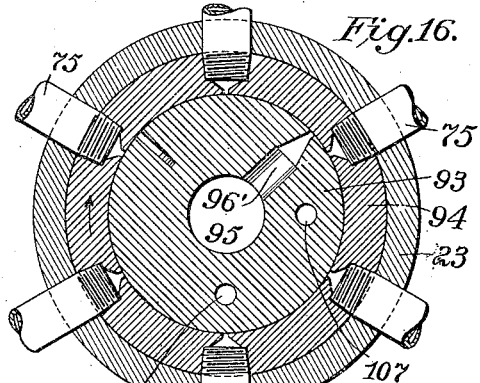

In the drawings:—Figure 1 is a vertical longitudinal section with parts shown in elevation. Fig. 2 is a top plan view of the machine with the casing shown in section. Fig. 3 is a sectional plan view on line 3—3 of Fig. 1. Fig. 3$^a$ is a detail of the main bracket supporting arm shown in Fig. 3. Fig. 4 is a plan view of the top of the machine showing the upper table. Fig. 5 is a side elevation of the same. Fig. 6 is a detached detail of the operating handle shown in Fig. 4. Figs. 7 and 8 are plan and sectional elevational views respectively of the upper spider frame. Figs. 9 and 10 are similar views of the lower spider frame. Fig. 11 is a plan view of a main supporting track with clamping means therefor. Fig. 12 is a sectional elevation on line 12—12 of Fig. 11. Figs. 12$^a$ and 12$^b$ are details of certain features of construction shown in Figs. 11 and 12. Fig. 13 is an enlarged vertical sectional view of the main multiple control valve. Figs. 14, 15, 16 and 17 are transverse sections taken on lines 14—14; 15—15; 16—16; and 17—17 respectively of Fig. 13. Fig. 18 is an enlarged sectional elevation of one of the supporting arms, with its cylinder and associated parts. Fig. 18$^a$ is a fragmentary sectional elevation of the upper end of one of the supporting arms, with the core diagrammatically shown as supported thereby. Fig. 19 is a top plan view of Fig. 18. Fig. 20 is a further detail of the upper supporting arm. Fig. 21 is a transverse vertical section of the bobbin with its associated driving and adjusting mechanisms. Fig. 21$^a$ is a fragmentary detail.

Fig. 22 is a side elevation of one of the carrying frames for the bobbin mechanism. Fig. 23 is a front elevation of the bobbin cage. Fig. 24 is a central vertical section of the bobbin cage. Fig. 25 is an end elevational view of the bobbin cage. Fig. 25ª is a detail view of one of the spacing means shown in Fig. 24 detached. Fig. 25ᵇ is a detail.

*Supporting structure.*—The machine is supported on a base-plate 1, adapted to be sunk below the floor-line, as indicated in Fig. 1. A metal casing 2 is built upon the base plate 1 and incloses the greater part of the machine. At the upper edge of the casing 2, a top plate 3 (shown in Figs. 4 and 5) is secured to form a table. A T-shaped supporting bracket 4 is provided at one end of the machine and is located near the bottom of the casing to furnish a suitable support for the core carrying arms and associated mechanisms. The bracket 4 comprises a long arm 4ª extending transversely across the casing from front to back, and a short arm 4ᵇ integral therewith and extending centrally therefrom at right angles and supported by the casing at the left hand end of the machine (see Figs. 2 and 3). At the places where the ends of the arms 4ª and 4ᵇ engage with the outer casing 2, openings 5 are formed therein having protruding flanges 5ª. At the upper edge of each opening 5 a square bearing plate 6 is formed, to which the projecting end of the corresponding arm is securely fastened by bolts. Near the opposite end of the casing a pair of transverse supporting brackets 7 and 8 are provided, one about half way up the height of the casing and the other near the bottom of same. The brackets 7 and 8 have their ends attached to and are supported by the outer casing 2 in a manner similar to the T-shaped bracket 4 above referred to. Numerous minor brackets are attached to the casing 2 at various places conveniently selected for the purpose of supporting the different shaftings and instrumentalities as will hereinafter appear.

*Driving mechanism.*—The main driving shaft 9 is horizontally supported in bearings 10 in the front and rear walls of the casing 2. At the rear of the machine the shaft 9 extends considerably beyond the casing and carries loosely thereon the driving pulley 11 adapted to be rigidly coupled to the shaft 9 by means of a sliding clutch 12, operated by a handle 13 at the front of the machine. The latter is connected by a rod 14 and pivoted lever 14ª having a fork engaging grooved collar 12ª of the clutch mechanism. The shaft 9 is additionally supported within the casing by a bearing 15 formed in the end of a short arm 16 integral with the upper bracket 7. A worm thread 17 is formed on the shaft 9 adjacent bearing 15 and meshes with a correspondingly formed worm pinion 18 keyed to the upper end of a vertically disposed shaft 19. The shaft 19 has its upper end suitably retained in a bearing 20 on the bracket 7, while its lower end is carried in a similar bearing 21 on the lower cross bracket 8. The shaft 19 extends somewhat below the bearing 21 and has pinned to its extremity a large spur gear 22. An upright hollow cylindrical sleeve 23 is supported in a tubular hub 24 integral with the T-shaped bracket 4 and has keyed to its lower end a spur gear 25 similar to the spur gear 22, except that the latter has one tooth less than the former. Motion is transmitted from gear 22 to gear 25 by an intermediate pinion 26 suitably supported by a post 28 attached to the base plate 1. The shaft 9 is also provided with a sliding sleeve 29 feather keyed thereto and carrying on its opposite ends a pair of beveled pinions 30, 31 adapted to be alternately thrown into mesh with a beveled gear 32 keyed to the lower end of a depending shaft 33. The shaft 33 has its upper bearing in a depending bracket 34 attached to the under side of the table 3, while its lower bearing is formed in a bracket arm 35 extending outwardly from the large transverse bracket 7. Means are provided, comprising a groove 36, in gear 30 and a pivoted clutch fork 37 fast on the lower end of rock shaft or rod 38 provided at its upper end with hand lever 38ª, for sliding the sleeve 29 to shift the gears 30 and 31 alternately into mesh with the gear 32. The bobbin winding mechanism is driven through the upper vertical shaft 33, while the ring core supporting and rotating mechanisms are driven through the lower vertical shaft 19.

*Core supporting and rotating mechanism.*—The upright hollow shaft 23, which, as previously described, is supported in a tubular hub 24 of the T-shaped bracket 4, forms the central structure about which the several instrumentalities, comprising the core carrying mechanisms, are directly or indirectly associated. This shaft or sleeve 23 does not have vertical movement but is constantly driven by the gears 22 and 25 and intermediate pinion 26. Suitably disposed along its length are two circular spiders 39 and 40 respectively. These spiders are pinned to the shaft or sleeve 23 and are rotated therewith.

The upper spider 39 is provided with a long tubular depending hub 41, surrounding the sleeve 23 and securely bolted to the lower spider 40, as shown in Fig. 1. They are each formed with a plurality of radially extending slotted portions 42 (six being shown here by way of illustration), adapted to support a corresponding number of vertical cylinders 43, which latter are radially adjustable within the slots 42. In order to accomplish the radial adjustment of the cylinders 43 along the slots 42, strips 44ᵃ are applied to the upper face of the spider 40 on each side of the slots 42 and slightly back from the edges thereof. Upon these strips 44ᵃ are secured strips 44 which are wider than strips 44ᵃ so as to project beyond the edges of strips 44ᵃ, the projecting or overhanging portions of strips 44 providing grooves between themselves and the portions of the spider adjacent the slots, which grooves receive the edges of the flanges 45. The strips 44ᵃ are slightly thinner than the flanges 45 so that when the cylinders have been adjusted, (the holding screws of strips 44 having been loosened), the subsequent tightening of the screws of the strips 44 will cause said strips to firmly clamp the flanges 45 between themselves and the spider 40, holding the cylinders clamped firmly in their adjusted positions. The cylinders 43 are provided with piston rods 46, which carry at their upper ends recessed pins 47 forming the core carrying arms, the pins 47 being adapted to engage with small pins 48 arranged along the inner circumference of the ring core C. The upper spider 39 is provided around its outer periphery with a hardened metal band 49, adapted to bear against a plurality of anti-frictional rollers 50, suitably carried in adjustable brackets 51 supported in openings in the wall of the casing 2. In other respects the spiders 39 and 40 are substantially similar in construction and are identical in purpose, in that each forms proper supporting bearings for the cylinders 43.

The ring carrying arms 46, viz: the piston rods of the cylinders 43, are adapted to be successively disengaged one at a time from the ring core C and withdrawn or dropped to a lowered position, in order to clear the bobbin and cord laying mechanism hereinafter to be described. The raising and lowering movements of the pistons 46 are accomplished automatically by a system of pneumatic control, which will be described in detail in a subsequent portion of the specification. A non-rotatable track 52 (see Figs. 1, 11, 12 and 12ᵃ) is slidably secured to the hub 24 of the cross arm or bracket 4 so as to be capable of vertical movement thereon but incapable of rotation. This track 52 extends concentrically around the hub 24 and is formed with a broken away portion, the purpose of which will be hereinafter referred to. The upper surface of the track 52 serves, when the latter is in its elevated position, as a suitable bearing surface for a plurality of rollers 53 carried at the extreme lower ends of the piston rods or arms 46. By having the track 52 formed with a broken away section, the pistons 46 are allowed to drop into their lowered positions when they are carried to that portion of their travel beneath the bobbin mechanism. A slightly beveled or inclined plate 52ᵃ is provided at one edge of the broken away portion of the track 52 and enables the rollers 53 of the piston rods to be gradually guided onto the main track surface without any abrupt jerk or jar to the moving parts. Just below the surface of the track 52 a flange 54 is formed integral with the hub portion of the track. This flange 54 is adapted to be engaged by a plurality of vertically movable pistons 55 mounted in cylinders 56, formed integral with arms 4ᵃ and 4ᵇ of the main bracket 4. The pneumatic means for controlling these pistons in their cylinders will be described in connection with the pneumatic control system for the other parts of the machine. It will be seen, however, that when the pistons 55 are in their lowered or retracted position, the track 52 will slide vertically down the hub 24 and consequently the several piston rods or core carrying arms 46, which normally bear against its upper surface, are allowed to drop away from the ring core C to permit of its removal. When the pistons 55 are raised to their elevated positions, the track 52 serves to support the piston rods 46 in their upper positions necessary for engagement with the pins on the ring core C (the only exception being those piston rods 46 which at the time are above the broken away section of the track).

In Fig. 1 of the drawings the core is shown elevated above the table in the position assumed when ready for the winding operation. When the winding operation is complete and the core is ready to be removed the lowering of the track first causes the arms 46 and core to descend together, until the core rests on the table, whereupon further downward movement of the track disengages the core carrying arms from the core, as above described. The core with its winding thereon having been removed and a fresh core laid on the table the first upward movement of the track effects the engagement of the arms 46 with the core and thereafter the further upward movement of the track elevates the core above the table, bringing it into such a position that the portion which passes through the shuttle is concentric therewith.

The hub 52ᵈ of the track member 52 is formed as a split collar, having a pair of ears or lugs 52ᵇ, one of which is threaded. A shaft 58, suitably carried in a bracket bearing 59 secured to the under side of the track 52 passes through an opening in one ear and has its end threaded to engage the screw threads of the other ear, said shaft is provided with a collar or flange 52ᶜ to bear against the unthreaded ear and carries at its outer end a bevel gear 60, adapted to mesh with a second bevel gear 61 carried on the inner end of a shaft 62, which latter shaft extends through the casing or frame of the machine and is provided at its outer end with a hand wheel 63 readily accessible to the operator. By the use of the means just described, it is evident that instead of relying upon the pistons 55 to maintain the track 52 in its elevated position, the split collar 57 can be clamped by turning the hand wheel 63 so as to hold the track 52 in any desired position along the hub 24.

The hollow shaft 23 contains a conical or tapered valve mechanism (Figs. 13 to 17) which is located approximately on line with or just above the surface of the lower spider 40. Above this valve mechanism a cylinder casing 64 is provided within the shaft 23 having a vertically movable piston 66, to the upper end of which is secured a bead carrying frame 67 adapted to be moved upwardly in relation to the ring core C to press the bead core firmly against the under side of the cord carcass. A separate bead carrying frame 68 is provided (as shown detached in Fig. 1), and has a central stem 68ª adapted to fit in and be pinned to a corresponding recess in the top of piston 66. By means of this removable frame a bead core is pressed in place against the upper side of the cord carcass on the ring core C.

*Pneumatic control system.*—The raising and lowering of track 52; the raising and lowering of the core carrying arms 46, the engaging and disengaging of the pins 47 with the ring core; and the raising and lowering of the bead carrying frames are all adapted to be controlled and effected by pneumatic or fluid pressure operating means. These means will next be described in the order named.

Referring particularly to Fig. 3 of the drawing, it will be seen that the machine is equipped with a main air supply pipe M and that a series of three operating handles 69, 70 and 71 are arranged at any convenient place within the operator's reach, for directing air from the main supply line into the several pneumatic operating devices. The handle 71 has two positions "on" and "off" and is manipulated to direct a supply of air through the pipe 72, and branches pipes 72ª, 72ᵇ and 72ᶜ to the bottoms of the cylinders 56. When this handle is turned to its "on" position, air pressure is applied to raise the pistons 55 and track 52. By turning the handle to its "off" position, the air is exhausted from beneath the pistons and the track 52 is allowed to drop. Handle 69 is similarly provided with two positions "on" and "off" respectively, and controls the supply of air under pressure to the conical valve mechanism in the hollow shaft 23, the air being conducted thereto through pipe 73, which passes centrally up through the lower end of shaft 23.

The conical valve mechanism is so arranged and constructed as to automatically regulate the supply of air to the various cylinders 43 for raising and lowering successively the pistons or core carrying arms 46, and it also simultaneously controls the supply of air to pneumatic devices for causing successive engagement and release of the pins 47 with ring core C. Before describing in detail the construction and operation of this conical valve mechanism, it is necessary to first understand the operation of the devices which it controls. The pistons 43 have been previously referred to and the manner in which they are carried by the upper and lower spiders 39 and 40 described. Referring now particularly to Figs. 18, 18ª, 19 and 20, it will be seen that each cylinder 43 comprises a main casing formed with a suitable bore in which the piston rod 46 and piston 46ª move. Air is supplied near the bottom of the cylinder through a pipe 75 from the cone valve for the purpose of raising the piston 46. A small air inlet 76 communicates from the pipe 75 directly into the side of the cylinder bore and a branch passageway 77 having a spring pressed ball valve 78 fixed therein communicates with a larger inlet 79 at the bottom of the cylinder bore. The passageway 77 is enlarged slightly below the ball valve, as at 77ª, and communicates with a right angle outlet port 80, which can be varied in size at will by an adjustablel needle valve 81. Exactly the same arrangement is provided near the top of the cylinder to supply the necessary air through a pipe 75' for forcing the piston 46 down to its lowered position. It will be seen that by the entrance ports 76, 76', supplemented by the passages 77, 77', ball valves 78, 78', main air inlets 79, 79', and needle controlled exit ports 80, 80', a very gradual initial movement will be imparted to the piston 46ª in either its upward or downward travel and furthermore, any desired cushioning effect can be secured at the end of its stroke. Fig. 18 illustrates clearly the manner of operation, for there the piston 46ª is shown in its upper position closing the port 76', while the upper port 79' is in open communication with the space above the piston 46ª. The movable piston rod 46 is hollow and its central bore serves as means for conducting a separate supply of air to the core engaging pins 47. A vertical rod 82, parallel to the piston rod 46 and connected thereto at its lower end by a drilled hole in roller bracket 83, moves up and down therewith, being guided in suitable bearings 84 provided in the cylinder casing 43.

The rod 82 has a central bore 85 which extends about a third of the way up from the bottom and terminates in a port 86 adapted to register with a port 87 in the cylinder casing to which air is supplied by a pipe 88 from the cone valve. The bore 85, at its lower end, communicates with the hole in roller bracket 83 and leads into the central bore of the piston rod 46. At the upper end of the piston rod 46 a small cylindrical casing 89 is attached (see Fig. 18ª) and carries the pin 47, which is formed at its rear end with an enlarged disk shape part or piston 47ª working in a piston chamber 90 formed in the cylindrical member 89. A small inlet air duct 91 communicates from the hollow bore of the piston rod 46 to the chamber 90 and as air under pressure is let in through this passage, it acts on the piston 47ª and moves the pin 47 outward into engagement with one of the projecting pins 48 carried along the inner side of the ring core C. A coil spring 92 is suitably located around a portion of the pin 47 and tends, when the air pressure is relieved, to retract the pin 47 into its casing 89 and out of engagement with the ring core pin 48. It will be understood that the cylinders 43 and pistons 46, together with their engaging pins 47, are all constructed exactly alike, hence a detail description of one set of these devices will suffice for all.

In order to effect a successive disengagement of the pins 47 and a subsequent dropping of the arms 46 as they come into the path of the bobbin casing, the conical valve mechanism hereinbefore referred to, is provided to automatically control the inlet and exhaust of the air or fluid pressure to the various pistons in the proper sequence. This valve mechanism is shown in detail in Figs. 14, 15, 16 and 17. It comprises a central conical member 93 fixed against rotation within the hollow shaft 23 by pipe 73 and adjusting lever 73ª. An outer rotating casing 94, adapted to move with and secured to the shaft 23, surrounds the fixed conical part 93. The main air supply is conducted into a central cylindrical chamber 95 in the cone shaped member 93 through the pipe 73, before referred to. A plurality of inlet and exhaust ports are provided in the walls of the casing 94 and hollow shaft 23. These inlet and exhaust ports are located circumferentially about the valve casing and shaft 23 and at different heights, the arrangement being such that each cylinder 43 is connected by one pipe 75 leading from its bottom to the valve casing and by another pipe 75' leading from its top to the valve casing. A pair of radial passageways 96 and 96' are formed in the fixed member 93 of the cone valve and extend from the central chamber 95 out to the circumferential surface in such position as to register successively with the inlet ports formed in the valve casing 94. The central fixed cone member 93 is further provided with a pair of exhaust passages 97, each of which is provided with two openings at its circumferential surface, one of which is adapted to register with an inlet passage connected with one of the pipes 75, while the other is adapted to register simultaneously with an exhaust port 98 opening into the atmosphere.

As the valve casing 94 revolves about the fixed inner cone member 93, the port connected by one of the pipes 75' to the top of one of the cylinders 43 will come in register with the inlet passageway 96 and air will be supplied thereto. At the same time the corresponding port connected by pipe 75 to the bottom of that same cylinder, will register with one of the ports of the passageway 97, while the other is in register with exhaust port 98. Hence, while the parts are in these relative positions, air will be supplied to the top of that cylinder to force the piston 46 downwardly and at the same time air beneath the piston will be exhausted from the bottom of the cylinder. When the parts have moved farther in a rotary direction, the port connected to pipe 75 will register with the air supply passageway 96' of the cone valve, and the port connected to pipe 75' will then be in register with one of the exhaust channel ways 97, hence the piston rod of that cylinder will be forced upwardly and air will be simultaneously exhausted from out the top. The exact sequence, in which the pistons are raised and lowered, is determined by the disposition of the several ports in the valve casing 94, as is also the time relation of their registering with the passageways 96 and 97 respectively. The purpose, of course, of lowering the several pistons 46 successively is to remove them from the path of the bobbin casing as the supporting structure rotates.

The rotating valve casing is also used to automatically control the supply of air pressure to the pins 47. A plurality of radial ports 100 are provided in the lower part of the valve casing 94 and are connected by pipes 88 to the ports 87 in the cylinder casings 43. The valve casing is formed with channels 99 in communication with these ports 100 and having two openings 101, 102, adjacent the cone valve on different levels. The cone member 93 is provided with a channel way 103 extending about three quarters of the way around its circumference, adapted to communicate directly with the upper openings 101. Air is supplied to this channel by a radial passageway 104, opening into the central chamber 95. The cone member 93 is further provided with a second channel 105 on a different level extending only about a quarter of the way around its circumference and adapted to register with the lower ports 102. This channel 105 is connected by a short outlet passage 106 directly out to the atmosphere and serves as exhaust means.

Figure 17:
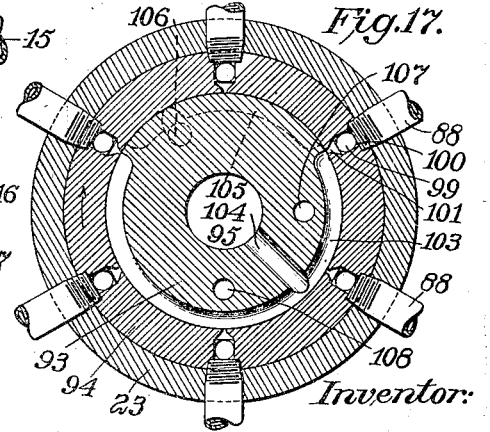

Referring to Figs. 13 and 17, it will be seen that while five of the ports 100 are in direct communication with channel 103 and are supplying air to the pins at the tops of their respective pistons, the other port 100 is at the same time connected by passageway 99, and port 102 with the exhaust channel 105. It is apparent that the air must be exhausted so as to release the pin 47 from engagement with pin on the ring core at the same time as that particular cylinder piston or arm 46 has arrived at the point in its travel where it is to be lowered.

The other pneumatically operated device is the one controlled by handle 70 for raising and lowering the bead carrying frame 67. As previously referred to, a cylinder 64 having a piston 66 movable therein, is located within the shaft 23 above the cone valve mechanism. The handle 70 can be set into one of three positions, "down," "off" and "up." When in the position marked "Up," air is conducted through a small pipe 107, which passes vertically up through a bore in the cone valve member 93 and supplies air to the under side of the piston 66, causing it to rise and press the bead against the underside of the ring core. When the handle 70 is in the position marked "Down," air is supplied to another pipe 108, which passes up through another part of the cone valve 93 and communicates with a circumferential channel 109, adapted to register with a port 110 connected by a pipe 111 to the top of the cylinder 64. The piston 66 will then be forced downwardly. When the handle 70 is in the position designated "Off" air is completely cut off from both pipes 107 and 108.

*Bobbin and winding mechanism.*—The bobbin and winding mechanism consists essentially of an adjustable bobbin frame carried at the top of the machine and containing a rotatable bobbin cage adapted to be positively driven in either direction. The bobbin frame consists of a pair of side plates 112 and 113 of peculiar construction (see Figs. 21 and 22). The side plates 112 and 113 are provided with rearwardly extending arms 114, which are securely fastened to one another by suitable bolts 115. Each of the side plates 112 and 113 is provided with a lug 116 at its outer side to which the ends of an arched yoke member 117 are bolted, as shown in Figs. 1 and 2. Referring to the plan view of the table or top of the machine, shown in Fig. 4, it will be seen that a rectangular opening is provided extending from the rear of the machine into and communicating with the large circular opening in which the ring core is supported and rotated. At either side of this opening the metal of the upper casing is slightly depressed to form the parallel guide-ways 118. Side flange 119 projecting from the side frame plate 112 rests in one guide-way and is adapted to bear against a gib 120 held by screws 120ª (see Fig. 21), which gib serves to support a second gib 122 overlapping the edges of gib 120 and flange 119 and held by screws 121. At one side of the frame the side plate 113 is provided with a straight rack 123 bolted to the flange member 118ª and having gear teeth formed in its upper surface. A horizontal shaft 124 suitably journaled in fixed bearing brackets 125 extends across the table to the edge of the machine and is provided at its outer end with a hand wheel 126 and at its inner end with a gear 127 adapted to mesh with the teeth of rack 123. Gibs 120 are slightly thinner than flanges 119 and 118ª so that after the frame has been properly located the screws 121 are tightened, thus binding the flanges in a definite position. In this manner the bobbin frame may be adjusted laterally across the table top to accommodate ring cores of different dimensions. The side plates 112 and 113 are provided with side flanges 128 of general circular contour, a portion of the side plates being broken away to leave a suitable opening through which the ring core is inserted for the winding operation. The bobbin cage, which is adapted to be rotatably supported between the two side members 112 and 113, consists of two ring plates 129 and 130, Fig. 25, fastened together by a series of spanners or spacers 131. The plates 129 and 130 are each made with a hinged gate segment 129ª and 130ª respectively adapted to be opened and closed in unison. The gate members are provided with tongue pieces 129ᵇ and 130ᵇ adapted to register with correspondingly shaped recesses 129ᶜ and 130ᶜ respectively. Clamping means are provided for maintaining the ring plate portions in closed position consisting of a pair of oppositely disposed brackets 132 and 133 formed integrally with a pair of adjacent spanners, one carried by the gate portions and the other by adjoining edges of the ring plates. In one of these brackets, viz. 132, a pivoted bolt provided with a wing nut is carried while the other bracket presents a forked end for receiving the bolt end.

The ring plates 129 and 130 are provided at their outer sides with annular flanges 134 adapted to fit between two series of antifrictional rollers 135 and 136 carried on pins around the inner sides of the side frames 112 and 113. In addition to the foregoing elements which the ring plates 129 and 130 have in common, one of them, plate 129, is provided with an exterior annular gear rack 137, by means of which rotary motion is imparted to the bobbin cage. At diametrically opposite points the ring plates are each formed with a pair of segmental slots 138 formed in a plane at right angles to their axes. Securely fastened within these slots are bearing plates 139 and spring-pressed catch devices 140 (shown in Fig. 21ª) adapted to receive the ends of the spool spindles 141 and hold them against rotation and displacement. The bobbin spools 142 are loosely carried on the spindles 141. A pair of pivoted laying fingers 143 are provided one for each bobbin. It will be understood that as the bobbin cage is driven in one direction cord is fed off one of the bobbin spools 142 and wound in spiral convolutions around the ring core, whereas when the bobbin cage is driven in the reverse direction cord is fed off the other bobbin spool and wound on the ring core in spiral convolutions at a reverse angle to the first series or layer.

The power for driving the bobbin cage, as has already been indicated, is transmitted from the main drive shaft 9 to a vertical upwardly extending shaft 33 having a bearing in the depending bracket 34. The shaft 33 carries at its upper end a bevel gear 144. Two horizontal parallel shafts 145 and 146 are suitably supported above the shaft 33 and at right angles thereto. The shafts 145 and 146 have one set of bearings in the bracket 34 and also are provided with sliding bearings in a depending L-shaped bracket arm 147 attached to and carried by the side member 113 of the bobbin casing. A beveled gear 148 pinned to the shaft 145 meshes with bevel gear 144 and forms a constant driving connection between the two. The shafts 145 and 146 are each provided with a pair of intermeshing gears 149, 150 and 151, 152, as shown in Fig. 1. The gears 149 and 150 on shaft 145 are keyed thereon. The key is adapted to be moved by means of a hand wheel 153 into or out of gear hubs 149 and 150. One set of the gears 150 and 152 are of the eccentric type, hence when this set is employed the shaft 146 is driven in such manner as to be alternately accelerated and retarded. The other set may be plain gears of a different ratio from the eccentric gears for varying the speed of rotation at which shaft 146 is driven. Shaft 146 is provided near its inner end with a bevel gear 154 slidably keyed thereon, which meshes with a small bevel gear 155 carried on a short shaft 156 journaled in an inverted U-shaped bracket 157 attached to the side member 113 of the bobbin casing. Shaft 156 carries at its opposite end a gear 158 adapted to mesh with the annular rack 137 carried by the ring plate 129 of the bobbin cage. It will be seen that the bobbin cage is thus rotated through the chain of gearing just described and that its rotary motion will be alternately accelerated and retarded when the driven power is transmitted from shaft 145 to 146, through the eccentric gears 150 and 152. The purpose of this is to vary the angle at which the cord is disposed around the surface of the ring core, for example, it is desired to have the cords lie closely disposed to one another along the inner circumference of the ring core and slightly separated at the other circumference, or tread portion.

The operation of the machine is as follows: Assume the track 52 to be in its lowered position with the supporting pistons 55 withdrawn within their cylinders 56; the cylinders 43 carrying the supporting piston arms 46 are adjusted radially in the slots 42 of the spiders 39 and 40 so as to accommodate themselves to the size of the ring core upon which the cord carcass is to be wound. While the cylinders 43 are still in their lowered position, the ring core C is placed upon the plate at the upper part of the casing in proper position, the hinged bobbin cage 129 being opened so as to permit of the core's proper placement. The gate of the bobbin cage is then closed and securely fastened by the wing nut latch. Handle 71 is then turned to its "on" position, which admits fluid pressure to the bottom of the cylinders 56 and raises the pistons 55 and track 52 supported thereon. When the track 52 has been raised to its proper elevated position so as to bring the arms 46 into engagement with the inner circumference of the ring core C, the track may be locked in this position by means of the mechanism operated through clamping hand wheel 63. The pressure beneath the pistons 55 may be left on or off as desired. Fluid pressure is then supplied to the air cone valve 93 by operating handle 69 to its "on" position. The machine is now started by operating handle 13 to couple the shaft 9 with the driving pulley 11. As soon as motion has been imparted to rotate sleeve 23, the valve casing will rotate about the cone valve 93 and the fluid pressure will be automatically distributed through the various ports and pipes to cause the pins 47 carried at the upper ends of the arms 46 to engage with the pins 48 on the inner side of the ring core C. Rotary motion will be simultaneously given to all of the piston supporting arms 46 by the movement of the spiders 39 and 40 in which they are mounted. The automatic operation of the several arms 46, by which they are successively lowered as they approach, in their path of travel the bobbin casing, and are again returned, after having passed the bobbin casing to engagement with the ring core, has already been previously described.

Gear wheel 30 or 31, according to the direction in which it is desired to have the bobbin cage moved about the ring core, is caused to engage with gear wheel 32 so as to drive shaft 33 and through gear 148 drive shaft 145, shaft 146 and by the mechanism already described, in connection with the bobbin cage, impart rotary motion to the bobbin cage in the desired direction. The eccentric gears 150 and 152 between shafts 145 and 146 are used so as to cause the bobbin cage to be alternately accelerated and retracted in its rotary motion about the ring core C. The purpose of this is to vary the angle of inclination at which the cord, fed from one of the bobbin spools, is wrapped spirally about the ring core C. This set of operations continues until a complete ply or layer of cord has been laid around the circumferential surface of the ring core, when the machine is stopped and the parts returned to their several normal positions. By having gear 22 formed with one less tooth than gear 25, provision is made for the exact even distribution of the cords about the circumferential surface of the ring core. It is thus possible to lay a second layer upon the first without having an extra convolution of cord which would present an uneven surface of the second layer.

After the first layer of cord has been completely wound upon the ring core or a second layer if desired, the bead core carried on the bead core frame 67 is stamped against the underside of the ring core C by operating handle 70 to its "up" position. The bead core, which is carried on the upper bead core member, is next applied to the upper side of the ring core by pinning the detached bead core carrier into the upper end of piston 66 and momentarily reversing the fluid pressure by turning handle 70 to its down position. The bead core mechanism is then withdrawn from its operating position and the machine restarted for the purpose of laying or winding the second layer of cord about the first layer.

In the second winding operation the opposite gear 30 or 31, as the case may be, that is the one not used for the first operation, is thrown into engagement with gear 32 to reverse the direction of the winding bobbin cage. The bobbin spool which was first used is now idle and the other is employed, so that the second layer of cord will be laid at a reverse angle to that at which the first was laid. The winding operation for the second layer is in other respects exactly similar to that employed for the first.

A valve cone adjusting lever 73ᵃ is provided at the bottom of the machine, secured to pipe 73 which extends upward to the cone valve. The cone valve is also secured to pipe 73, so that by shifting the adjusting lever a slight amount, the ports of the cone valve are also shifted, thus causing an earlier or later dropping of the core supporting arms or pistons and a corresponding earlier or later raising of the pistons. Pipe 73 has a swivel joint at its lower end to permit this movement. Any suitable means may be provided for locking this lever in its adjusted position, as for example set screws carried by lugs or projections on the frame and engaging opposite sides of the lever (not shown).

Having thus described my invention what I claim is:—

1. In a tire winding machine, the combination with a ring core, of a plurality of supporting arms positively engaging the inner circumference of the core and pneumatically operated means for moving said arms successively out of and into engagement with said core.

2. In a tire winding machine, the combination with a ring core, of a plurality of arms supporting the core by engagement with its inner circumferential surface, means for rotating said arms simultaneously and pneumatic means for successively retracting the arms from engagement with the core and returning them thereto.

3. In a tire winding machine, the combination with a ring core, of a plurality of slidable supporting arms engaging the core along its inner periphery, means for moving said arms simultaneously around the axis of the core, and pneumatic means for causing said arms to be slid successively into and out of engagement with the core.

4. In a tire winding machine, the combination with a ring core, of a bobbin ring encircling a portion of the core, a plurality of supporting arms for rotating said ring core and pneumatically operated means for successively withdrawing and returning said arms as they pass the bobbin ring.

5. In a tire winding machine, the combination with a ring core, of a bobbin ring casing in interlocked position around a portion of the core, a plurality of vertically movable supporting arms engaging the ring core along its inner periphery, means for rotating said arms simultaneously and pneumatic means for successively moving each of said arms vertically away from said ring core as it passes the bobbin casing and for returning it subsequently thereto.

6. In a tire building machine, the combination with a ring core, of a plurality of vertically movable supporting arms engaging the inner circumference of the core, means for rotating said arms simultaneously and pneumatic means for successively raising said arms into and lowering them out of engagement with said ring core.

7. In a tire building machine, the combination with a ring core, of a plurality of vertically movable arms carrying said ring core, means for rotating said arms simultaneously and pneumatic means operating automatically for successively moving each of said arms into and out of engagement with said core.

8. In a tire building machine, the combination with a ring core, of a plurality of vertically movable supporting arms, pins carried by said arms for engaging the core, means for rotating said arms simultaneously, pneumatic means for causing the successive engagement and release of said pins with the core, and pneumatic means for successively lowering and raising said supporting arms.

9. In a tire building machine, the combination with a ring core, a plurality of vertically movable supporting arms carrying the core, means for simultaneously rotating said arms, means for successively lowering and raising the arms out of and into engagement with the core, and means for maintaining in an elevated position the arms while in engagement with said core.

10. In a tire building machine, the combination with a ring core, of a plurality of vertically movable supporting arms carrying the core, means for simultaneously rotating said supporting arms, means for successively lowering and raising said arms out of and into engagement with the ring core, and means permitting all of said arms to be lowered simultaneously for removing the ring core from the machine.

11. In a tire building machine, the combination with a ring core, of a plurality of vertically disposed fluid operated cylinders, a plurality of vertically movable pistons in said cylinders, said pistons forming supporting arms for the ring core, means for successively lowering and raising said pistons out of and into engagement with said ring core.

12. In a tire building machine, the combination with a ring core, of a plurality of vertically disposed fluid-operated cylinders, a plurality of vertically movable pistons in said cylinders for supporting the ring core, means for simultaneously rotating said pistons, and means for successively lowering and raising said pistons out of and into engagement with said ring core.

13. In a tire building machine, the combination with a ring core of a plurality of fluid operated vertically movable supporting arms, means for simultaneously rotating said arms, means for successively lowering and raising said supporting arms out of and into engagement with the ring core, said means including a rotary fluid valve.

14. In a tire building machine, the combination with a ring core, of a plurality of fluid-operated vertically movable supporting arms, fluid operated pins at the upper ends of said arms adapted for engagement with the ring core, means for simultaneously rotating said arms, means for successively disengaging said pins from the ring core, lowering the arms and returning them to their original position.

15. In a tire building machine, the combination with a ring core of a plurality of fluid-operated vertically movable supporting arms, fluid operated pins at the upper ends of said arms adapted for engagement with the ring core, means causing successive disengagement of said pins from the core and subsequent lowering of the supporting arms, said means including a single rotary fluid controlling valve.

16. A tire building machine, comprising in combination core supporting and rotating mechanism, cord winding mechanism and means for applying a bead core to the cord carcass being formed.

17. A tire building machine, comprising in combination, core supporting and rotating mechanism, cord winding mechanism and means for applying bead cores to the opposite sides of the ring core during the building of the cord casing.

18. A tire building machine, comprising in combination, core supporting and rotating mechanism, means for winding a plurality of plies of cord about said ring core, and pneumatically operated means for supplying bead cores to opposite sides of the ring core at a suitable time in the tire building process.

19. In a tire building machine, the combination with a rotatable ring core, of winding means comprising a hinged bobbin cage, cord bobbin spools loosely carried therein and means for varying the speed of the winding means to vary the angle of inclination of the cord on the ring core.

20. In a tire building machine, a plurality of annularly arranged vertical core supporting members, and core engaging pins carried by the upper ends of said members and movable radially to engage and disengage the core.

21. In a tire building machine, a plurality of annularly arranged core carrying members, with means for causing them to move in an annular path to rotate the core, core engaging devices carried by said members, means for moving said devices in a direction radially of the core to effect their engagement therewith and disengagement therefrom, and means for moving said members in a direction parallel with the axis of the core when said devices are disengaged from the core.

22. In a tire building machine, the combination with a vertically movable ring core, of a plurality of annularly disposed members arranged to support said ring core, means for causing them to travel in said annular path to rotate the ring core, and means for successively moving said members in a rectilinear path to disengage them from and reëngage them with the ring core.

23. In a tire building machine, the combination with a ring core, of a plurality of parallel annularly disposed members, means for causing them to travel in an annular path, radially movable core engaging devices carried by said members, and means for successively operating said core engaging devices and successively imparting rectilinear movement to said members.

24. In a tire building machine, the combination with a ring core, of a plurality of annularly disposed members, means for causing them to travel in an annular path, means for successively imparting a rectilinear reciprocating movement to said members, radially movable core engaging devices carried by said members with means for operating them successively, and means for effecting disengagement of all of said core engaging devices from the core.

25. In a tire building machine, the combination with a ring core, of a rotatable carrier, a plurality of annularly disposed members supported by said carrier to have lengthwise movement and having core engaging devices at one end, a non-rotary track having a portion to coöperate with the opposite ends of said members throughout the greater part of their travel to hold them in core engaging position, and another portion to permit successive movement out of core engaging position, and means for operating said core engaging devices coincidently with coaction of the members with said other portion of the track.

26. In a tire building machine, the combination with a ring core, of a rotatable carrier, a plurality of annularly disposed members supported by said carrier to have lengthwise movement and having core engaging devices at one end, a non-rotary track having a portion to coöperate with the opposite ends of said members throughout the greater part of their travel to hold them in core engaging position and another portion to permit successive lengthwise movement of said members, and means for moving said track in a direction parallel with the axis about which said members travel.

27. In a tire building machine, the combination with a ring core, of a rotatable carrier, a tubular support about which said carrier rotates, a plurality of annularly disposed parallel members mounted to have lengthwise movement in said carrier, and having core engaging devices, means for moving said members into and out of core engaging position, a shaft mounted to reciprocate within said tubular support, and a pair of bead placing rings carried by said shaft.

28. In a tire building machine, the combination with a ring core, of a rotatable carrier, a tubular support about which said carrier rotates, a plurality of annularly disposed parallel members mounted to have lengthwise movement in said carrier, and having core engaging devices, means for moving said members into and out of core engaging position, a shaft mounted to reciprocate within said tubular support, and a pair of bead placing rings carried by said shaft, one of said bead placing rings being removable.

29. In a tire building machine, the combination with a ring core, of a rotatable carrier, a tubular support about which said carrier rotates, a plurality of annularly disposed parallel members mounted to have lengthwise movement in said carrier and having core engaging devices, means for moving said devices into and out of core engaging position, a shaft mounted to reciprocate within said tubular support, a pair of spaced bead placing rings carried by said shaft, and fluid operated means for moving said shaft in either direction.

30. In a machine of the character described, the combination with a ring core, and relatively stationary winding mechanism for winding a cord about said core, of means for rotating said ring core comprising a rotary carrier with means for rotating it in either direction, a plurality of parallel annularly disposed members supported by said carrier to have lengthwise movement and having core engaging devices, means for reciprocating a plurality of said members to effect engagement with the core, means for successively reciprocating each member to clear the winding device and returning it to core holding position.

31. In a machine of the character described, ring core supporting means comprising a pair of rotatable spiders, guides or cylinders carried by said spiders and capable of adjustment radially thereof, members mounted to reciprocate in said guides or cylinders and carrying core engaging devices, and means for operating said members.

32. In a machine of the character described, a ring core having a plurality of inwardly extending projections, circular core carrying means, and radially movable devices carried by said carrying means for engaging said projections.

33. In a machine of the character described, a ring core, circularly arranged core carrying and rotating means, radially movable core engaging devices carried by said means, and means for imparting radial movement to said devices.

34. In a machine of the character described, a ring core, circularly arranged core carrying and rotating means, radially movable core engaging devices carried by said means, springs for moving said devices in one direction, and means for moving said devices against the tension of said springs.

35. In a machine of the character described, a ring core, circularly arranged core carrying and rotating means, radially movable core engaging devices carried by said means, springs for moving said devices in one direction, and means for moving one or more of said devices against the tension of the springs.

36. In a tire building machine, the combination with a ring core of a plurality of fluid-operated vertically movable supporting arms, fluid operated pins at the upper ends of said arms adapted for engagement with the ring core, means causing successive disengagement of said pins from the core and subsequent lowering of the supporting arms, said means including a single rotary fluid controlling valve, and manually operated adjusting means for timing the operation of said valve.

37. In a tire building machine, the combination with a ring core of a plurality of fluid-operated vertically movable supporting arms, fluid operated pins at the upper ends of said arms adapted for engagement with the ring core, means causing successive disengagement of said pins from the core and subsequent lowering of the supporting arms, said means including a single rotary fluid substantially cylindrical controlling valve, having fluid passages, a relatively stationary member within said valve having coacting passages, a fluid supply pipe connected to said member and capable of rotary adjustment, and means for effecting said rotary adjustment.

In testimony whereof, I affix my signature.

WALTER R. DENMAN.

Witnesses:
  C. A. WOLF,
  D. E. KIMBALL.